US010099855B1

(12) United States Patent
Higgins, II

(10) Patent No.: US 10,099,855 B1
(45) Date of Patent: Oct. 16, 2018

(54) CAN LINER CINCH DEVICE AND METHOD OF USE

(71) Applicant: Michael S. Higgins, II, Cuyahoga Falls, OH (US)

(72) Inventor: Michael S. Higgins, II, Cuyahoga Falls, OH (US)

(*) Notice: Subject to any disclaimer, the term of this patent is extended or adjusted under 35 U.S.C. 154(b) by 59 days.

(21) Appl. No.: 15/237,570

(22) Filed: Aug. 15, 2016

Related U.S. Application Data

(60) Provisional application No. 62/205,097, filed on Aug. 14, 2015.

(51) Int. Cl.

| | |
|---|---|
| ***B65D 25/14*** | (2006.01) |
| ***B65F 1/14*** | (2006.01) |
| ***F16M 13/02*** | (2006.01) |
| ***B65F 1/00*** | (2006.01) |

(52) U.S. Cl.
CPC .......... *B65F 1/1415* (2013.01); *B65F 1/0006* (2013.01); *F16M 13/022* (2013.01)

(58) Field of Classification Search
CPC .... B65F 1/1415; B65F 1/0006; F16M 13/022
USPC ............. 248/74.1, 74.4, 82, 101, 113, 316.5, 248/316.6, 229.13, 229.16, 229.1, 230.4, 248/231.51, 231.8, 231.85, 56, 62, 63, 248/100, 689, 84, 88; 24/30.5 S, 343, 24/344, 346, 347, 348; 220/495.08, 220/495.07, 495.1, 495.11
See application file for complete search history.

(56) References Cited

U.S. PATENT DOCUMENTS

| | | | |
|---|---|---|---|
| 981,639 | A | 1/1911 | Hall |
| 2,531,003 | A | 11/1950 | Slaker |
| 297,060 | A | 1/1961 | Reiner |
| 4,339,099 | A | 7/1982 | Barton |
| 439,479 | A | 7/1983 | Groth |
| 4,418,835 | A | 12/1983 | Watts |
| 4,835,820 | A | 6/1989 | Robbins |
| 4,866,818 | A | 9/1989 | Thompson |
| 4,925,056 | A | 5/1990 | McCoig |
| 4,932,955 | A | 6/1990 | Merz et al. |
| 5,028,022 | A | 7/1991 | Metcalf |
| 5,088,667 | A | 2/1992 | Olson |
| 5,267,374 | A | 12/1993 | Drake |
| 5,305,500 | A | 4/1994 | Tucker |
| 5,419,452 | A | 5/1995 | Mueller |
| 5,636,416 | A | 6/1997 | Anderson |

(Continued)

FOREIGN PATENT DOCUMENTS

| | | | | |
|---|---|---|---|---|
| GB | 2028413 A | * | 3/1980 | ......... B65D 33/1625 |
| GB | 2489316 A | * | 9/2012 | ........... A63B 55/408 |

*Primary Examiner* — Kimberly T Wood
(74) *Attorney, Agent, or Firm* — The Richards Law Firm LLC; William B. Richards, Esq.

(57) ABSTRACT

A trash bag cinch device and method of use are provided for securing a trash bag to a trash can. According to one embodiment, the cinch device includes a collar, and the collar includes a base with teeth and a cuff with teeth. The cuff is moveable between an open position and a closed position and, when the cuff is closed, the base and the cuff describe an opening. And, when closed the base teeth and cuff teeth generally point toward the opening. The cinch device further includes a clamp adapted to secure the cinch device to a trash can rim. When thus positioned, a portion of the trash bag may be threaded through the opening and held by the teeth, thus securing the trash bag to the trash can.

2 Claims, 14 Drawing Sheets

(56) References Cited

U.S. PATENT DOCUMENTS

| | | | | |
|---|---|---|---|---|
| 5,645,186 | A | 7/1997 | Powers | |
| 5,695,088 | A | 12/1997 | Kasbohm | |
| 5,735,495 | A | 4/1998 | Kubota | |
| 5,911,335 | A | 6/1999 | Baumann | |
| 5,997,178 | A | 12/1999 | Nye | |
| 6,102,239 | A | 8/2000 | Wien | |
| 6,176,455 | B1 | 1/2001 | Agnes | |
| 6,286,706 | B1 | 9/2001 | Tucker | |
| 7,628,996 | B2 | 5/2004 | Roscow | |
| 6,918,505 | B2 | 7/2005 | Gifford | |
| 7,980,411 | B2 | 7/2011 | Kasbohm | |
| 8,292,114 | B1 | 10/2012 | Tabele | |
| 8,672,171 | B2 | 3/2014 | Wynn et al. | |
| D714,510 | S | 9/2014 | Yang et al. | |
| 2005/0017010 | A1 | 1/2005 | Siegel | |
| 2006/0056741 | A1 | 3/2006 | Yang | |
| 2007/0034334 | A1 * | 2/2007 | Ramsey | B65F 1/06 156/293 |
| 2008/0191103 | A1 | 8/2008 | Thurgar | |
| 2008/0257890 | A1 | 10/2008 | Kovacevich et al. | |
| 2008/0264948 | A1 | 10/2008 | Kovacevich et al. | |
| 2009/0056081 | A1 | 3/2009 | Lin | |
| 2009/0261106 | A1 | 10/2009 | Stelmach | |
| 2011/0139792 | A1 | 6/2011 | Lin | |
| 2014/0053938 | A1 * | 2/2014 | Persaud | F16L 3/10 138/106 |

* cited by examiner

CAN LINER CINCH DEVICE AND METHOD OF USE

CROSS-REFERENCE TO RELATED APPLICATION

This application claims priority U.S. Prov. App. No. 62/205,097, filed Aug. 14, 2015, entitled “Trash Bag Securing Device”, which is incorporated herein by reference.

FIELD

This description relates generally to devices for securing a can liner to a top rim of a can and more particularly to cinching a trash bag around a top rim of a trash can. Similarly, a trash bag may be hung from an edge of a table or counter such that the bag opens to accept trash.

BACKGROUND

It is common to place a trash can liner, for example, a trash bag, on the inside of a trash can to receive refuse, garbage, and other trash. Conventionally, a top edge of the bag is simply draped over a rim of the can. This helps to protect the can from being soiled by discarded trash, particularly by food particles, which can spoil and attract unwanted pests and disease. Draping the bag over the can rim is also an attempt to keep the bag from sliding down into the can as it is filled. When the bag becomes full or is otherwise ready to be removed, it is grasped by the top edge and pulled from the can. Typically, the top edge of the bag includes ties with which the bag can be tied shut so that the contents do not spill out during further handling.

Both trash cans and trash bags come in a variety of sizes and the bags seldom fit perfectly and snuggly onto the can. If the bag is too small, the top edge cannot be draped over the can rim. The usual case, however, is that the bag is too large and even though draped over the can rim, the bag tends to fall down into the can when trash is placed into it. When this happens, not only can the discarded trash spill out of the bag, but one must physically grab the top edge of the bag, pull it up, and re-drape it over the can rim.

One method of preventing the bag from falling into the can is to tie a knot in a strip formed of a portion of the bag top edge to effectively reduce the diameter of the bag opening so that the bag top edge can be snuggly draped over the can rim. Unfortunately, this method requires a level of manual dexterity and necessitates untying the knot when the bag must be removed and tied shut.

Thus, there is a need for a device and method for easily, quickly, and effectively securing a bag top edge to a can rim as well as easily, quickly, and effectively releasing the bag from the can.

There are also situations where the bag needs to be mounted onto an edge of a table or counter, for example, at a picnic ground when no trash can is available. And, ideally, a corner of the bag top edge is secured to the table edge so that the bag hangs open somewhat to facilitate receiving trash. Conventional methods generally employ a strip of tape or other adhesive to secure the bag to the table. Of course, the tape must be strong enough to hold the bag yet easily removed when the bag must be removed. Alternatively, a heavy object is placed onto the bag top edge to keep the bag from sliding off the table. Thus, there is a need for a device and method for easily, quickly, and effectively securing a trash bag top edge to a table edge as well as easily, quickly, and effectively releasing the bag from the table edge.

BRIEF SUMMARY OF THE INVENTION

Disclosed is a device and method for securing a trash bag top edge over a can rim and for releasing the bag when it must be removed from the can. In an alternative embodiment, a device and method are disclosed for securing an open trash bag top edge to an edge of a table or counter.

In one embodiment, a can liner cinch device comprises a clamp and a collar and the collar comprises a base and a cuff. The clamp is secured to a back side of the collar. The clamp comprises a support to which a lever is attached with a spring-loaded hinge. The lever comprises a pinch bar which, with spring tension, is urged toward the back side of the base. Alternatively, the support may be extended so that the pinch bar is urged toward the support extension. In a particular embodiment, the pinch bar is proximal to the cuff. By manipulating an end of the lever distal from the pinch bar, the spring tension is overcome and the pinch bar is pulled away from the back side of the base. The clamp support may further comprise a stop in a spaced-apart relation to the pinch bar which is adapted to enable the device to rest against an edge, a trash can rim or the edge of a table or counter, for example. The cuff may be generally shaped like an arc or a semicircle and comprises a hinged end and a free end. The hinged end of the cuff is attached to the base with a hinge which allows the cuff to move between a closed position and an open position. When the cuff is in the closed position, the cuff and a concave portion of the base define an opening. The cuff and the concave portion of the base are formed to include teeth which are directed into the opening and the cuff and the base collectively include at least one tooth. The teeth are adapted to grip the material of which the trash bag is formed, such as, for example, low density polyethylene (LDPE), linear low density polyethylene (LLDPE), medium density polyethylene (MDPE), high density polyethylene (HDPE), polypropylene (PP), or oxo-biodegradable plastic, which comprises conventional polyolefin plastic to which has been added small amounts of metal salts, which salts catalyze the degradation process to speed it up so the oxo-plastic will degrade at the end of its useful life in the presence of oxygen much more quickly than ordinary plastic. Such teeth may be made from a soft, semi-flexible material which grips the trash bag material. The teeth may also be set at an angle, or biased, away from the back side relative to the collar to provide spring-like action to secure the bag and keep it from sliding back. To keep the cuff in the closed position, a fastener may be provided whereby the cuff free end and the base may be releaseably secured, during use, for example. Alternatively, the cuff hinge may be omitted with the cuff comprising two free ends. Each free end may then be attached to the base of the collar, for example, with a snap connection.

To use the cinch device with, for example, a trash can and trash bag, a trash bag is inserted into the trash can and the bag top edge draped over the trash can rim. The bag strip, gathered from the bag top edge, is threaded through the opening defined by the cuff and the base. Alternatively, the cuff is initially in the open position and the cuff is closed around the bag strip. The cinch device is then clamped to the can rim over the draped bag and the bag strip pulled snuggly against the teeth. Thus, the bag top edge is secured around the can rim and held in place with the device. More particularly, the teeth grab the bag strip and keep it from sliding backward toward the can. When the bag needs to be removed, the cuff is unfastened and opened which allows the bag strip to be removed, the device is unclamped from the can rim, and the bag removed from the can.

In an alternative embodiment, the clamp comprises a channel which is configured to be placed over the can rim. In a further embodiment, the channel comprises a pusher bar which is attached to an interior surface of the channel by a spring. In use, the spring urges the pusher bar against the can rim to hold the device in place.

In a further embodiment, the clamp comprises a support, a lever, a spring-loaded hinge, and a pinch bar positioned on the back side of the base such that the pinch bar is distal to the cuff. This configuration enables the device to be clamped to, for example, the edge of a table or counter and a trash bag hung vertically by having a bag strip secured by the teeth. A like configuration may be effected with the channel clamp, wherein the open channel faces away from the cuff. Alternatively, the clamp may be pivotably mounted so that the clamp may be pivoted from one position to the other, depending upon the need at the time.

In a further embodiment, a can liner cinch device comprises a clamp and a tongue-shaped collar, the collar comprising a base portion and a cuff portion. The cuff may be generally shaped like a semicircle and comprises a hinged end and a free end. The hinged end of the cuff is attached to the base with a hinge which allows the cuff to move between a closed position and an open position. When the cuff is in the closed position, the cuff and a concave portion of the base define an opening. The cuff and the concave portion of the base are formed to include teeth which are directed into the opening. In addition to the teeth described herein above, the cuff and the base may include serrated edges as teeth. To keep the cuff in the closed position, a fastener may be provided whereby the cuff free end and the base may be releaseably secured, during use, for example. Alternatively, the hinge may be omitted with the cuff comprising two free ends. Each free end may then attached to the base of the collar, for example, with a snap connection. Attached to the collar with a spring-loaded hinge is a clamp which is configured to secure the device to the rim of a trash can.

To use the tongue embodiment of the cinch device with, for example, a trash can and trash bag, a trash bag is inserted into the trash can and a bag edge draped over the trash can rim. A bag strip, gathered from the bag top edge, is threaded through the opening defined by the cuff and the base. Alternatively, the cuff is initially in the open position and the cuff is closed around the bag strip. The cinch device is then clamped to the can rim over the draped bag and the bag strip pulled snuggly against the teeth. Thus, the bag top edge is secured around the can rim and held in place with the device. More particularly, the teeth grab the bag strip and keep it from sliding backward toward the can. When the bag needs to be removed, the cuff is unfastened and opened which allows the bag strip to be removed, the cinch device is unclamped from the can rim, and the bag removed from the can.

In a further embodiment, a can liner cinch device comprises a clamp, a backing plate, and a collar, and the collar comprises a base and a cuff. The clamp is secured to a back side of the backing plate and the clamp comprises a support to which a lever is attached with a spring-loaded hinge. The lever comprises a pinch bar which, with spring tension, is urged toward the back side of the backing plate. Alternatively, the support may be extended so that the pinch bar is urged toward the support extension. By manipulating an end of the lever distal from the pinch bar, the spring tension is overcome and the pinch bar is pulled away from the back side of the backing plate. The clamp support may further comprise a stop in a spaced-apart relation to the pinch bar which is adapted to enable the device to rest against an edge, a trash can rim or the edge of a table or counter, for example. The collar is hingedly attached to a front side of the backing plate. The cuff may be generally shaped like a semicircle and comprises a hinged end and a free end. The hinged end of the cuff is attached to the base with a hinge which allows the cuff to move between a closed position and an open position. When the cuff is in the closed position, the cuff and a concave portion of the base define an opening. The cuff and the concave portion of the base are formed to include at least one tooth. Such teeth may be made from a soft, semi-flexible material which grips the trash bag material. The teeth may also be set at an angle, or biased, away from a side of the collar that faces the backing plate to provide spring-like action to secure the bag strip and keep it from sliding back. To keep the cuff in the closed position, a fastener may be provided whereby the cuff free end and the base may be releaseably secured, during use, for example. Alternatively, the cuff hinge may be omitted with the cuff comprising two free ends. Each free end may then be attached to the base of the collar, for example, with a snap connection.

The hingedly attached collar provides flexibility in use. In a further embodiment, the collar hinge is a detent hinge, also variously known as a ratchet hinge or incremental locking hinge. A detent hinge allows the collar to be rotated about the collar hinge into various fixed positions, thus exerting more or less tension on the bag top edge via tension on the bag strip. Further, the clamp and backing plate can not only be used to attach the device to a can rim, but can also be used to attach the device to a table or counter edge as discussed above whereby the trash bag may be hung vertically using the same device as that used in a trash can environment.

In a further embodiment, a trash can liner cinch device comprises a collar, the collar having a front side and a back side, the collar comprising a base, the base comprising a first corner, a second corner, and a concave edge, the concave edge formed between the base first corner and the base second corner, the base concave edge comprising a plurality of flexible teeth, the base teeth attached to and projecting away from the base concave edge, the base teeth biased toward the collar front side. The collar further comprises a cuff, the cuff forming an arc, the arc comprising a concave edge, the cuff comprising a plurality of flexible teeth, the cuff teeth attached to and projecting away from the arc concave edge, the cuff teeth biased toward the collar front side, a cuff hinged end, the cuff hinged end hingedly attached to the base first corner, and a cuff free end, the cuff free end adapted to fasten to the base second corner, wherein when the cuff is fastened to the base, the base concave edge and the cuff concave edge cooperate to form an opening. The cinch device further comprises a clamp, the clamp comprises a support, the clamp support affixed to the collar back side, a lever, the clamp lever hingedly attached to the support, the clamp lever comprising a pinch bar, and a stop, the clamp stop affixed to the clamp support, the clamp stop in a spaced-apart relation to the clamp pinch bar.

A method is provided for cinching a trash can liner to a trash can, comprising the steps of (a) placing a trash can liner into a trash can, the trash can liner comprising a top edge and the trash can comprising a rim, (b) gathering a portion of the trash can liner top edge into a strip, (c) placing the trash can liner strip into the opening of a trash can liner cinch device, whereby the trash can liner strip is at least partially secured within the trash can liner cinch device opening, (d) fastening the cinch device cuff to the cinch device collar of the cinch device, and (e) clamping the trash can liner cinch device to the trash can rim.

In a further embodiment, a trash can liner cinch device comprises a collar, the collar having a front side and a back side, the collar comprises a base and the base comprises a tooth. The collar further comprises a cuff and the cuff comprises a tooth. The cuff is adapted to be releaseably secured to the base, whereby the cuff and the base cooperate to form an opening and wherein when the cuff is secured to the base, the base tooth and the cuff tooth project into the opening. The cinch device further comprises a clamp affixed to the collar back side, the clamp configured to secure the cinch device to a trash can rim.

In a further embodiment, a trash can liner cinch device comprises a backing plate, the backing plate have a front side and a back side, a collar, the collar hingedly attached to the backing plate front side, the collar having a front side and a back side, the collar comprising a base, the base comprising a plurality of teeth. The collar further comprises a cuff, the cuff comprising a plurality of teeth, the cuff adapted to be releaseably secured to the base, whereby the cuff and the base cooperate to form an opening and wherein when the cuff is secured to the base, the collar teeth and the cuff teeth project into the opening. The cinch device further comprises a clamp, and the clamp comprises a support, the clamp support affixed to the backing plate back side, a lever, the clamp lever hingedly attached to the support, the clamp lever comprising a pinch bar, and a stop, the clamp stop affixed to the clamp support, the clamp stop in a spaced-apart relation to the clamp pinch bar.

A further method is provided for cinching a trash can liner to a trash can, comprising the steps of (a) placing a trash can liner into a trash can, the trash can liner comprising a top edge and the trash can comprising a rim, (b) gathering a portion of the trash can liner top edge into a strip, (c) placing the trash can liner strip into the opening of the hinged trash can liner cinch device described just above, whereby the trash can liner strip is at least partially secured within the trash can liner cinch device opening, (d) fastening the trash can liner cinch device cuff to the trash can liner cinch device base, (e) clamping the trash can liner cinch device to the trash can, and (f) adjusting the hinge position of trash can liner cinch device.

Features and advantages of the invention will be explained in respect of the various embodiments with reference to the following drawings.

BRIEF DESCRIPTION OF THE SEVERAL FIGURES

The invention will be more readily understood by reference to the accompanying figures. The figures are incorporated in, and constitute a part of, this specification, illustrate several embodiments consistent with the invention, and, together with the description, serve to explain the principles of the invention. For purposes of illustration, drawings may not be to scale.

In describing the various embodiments of the invention, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

While certain preferred embodiments of the present invention have been disclosed in detail, it is to be understood that various modifications may be adopted without departing from the spirit of the invention or scope of the following claims.

Figure 1:
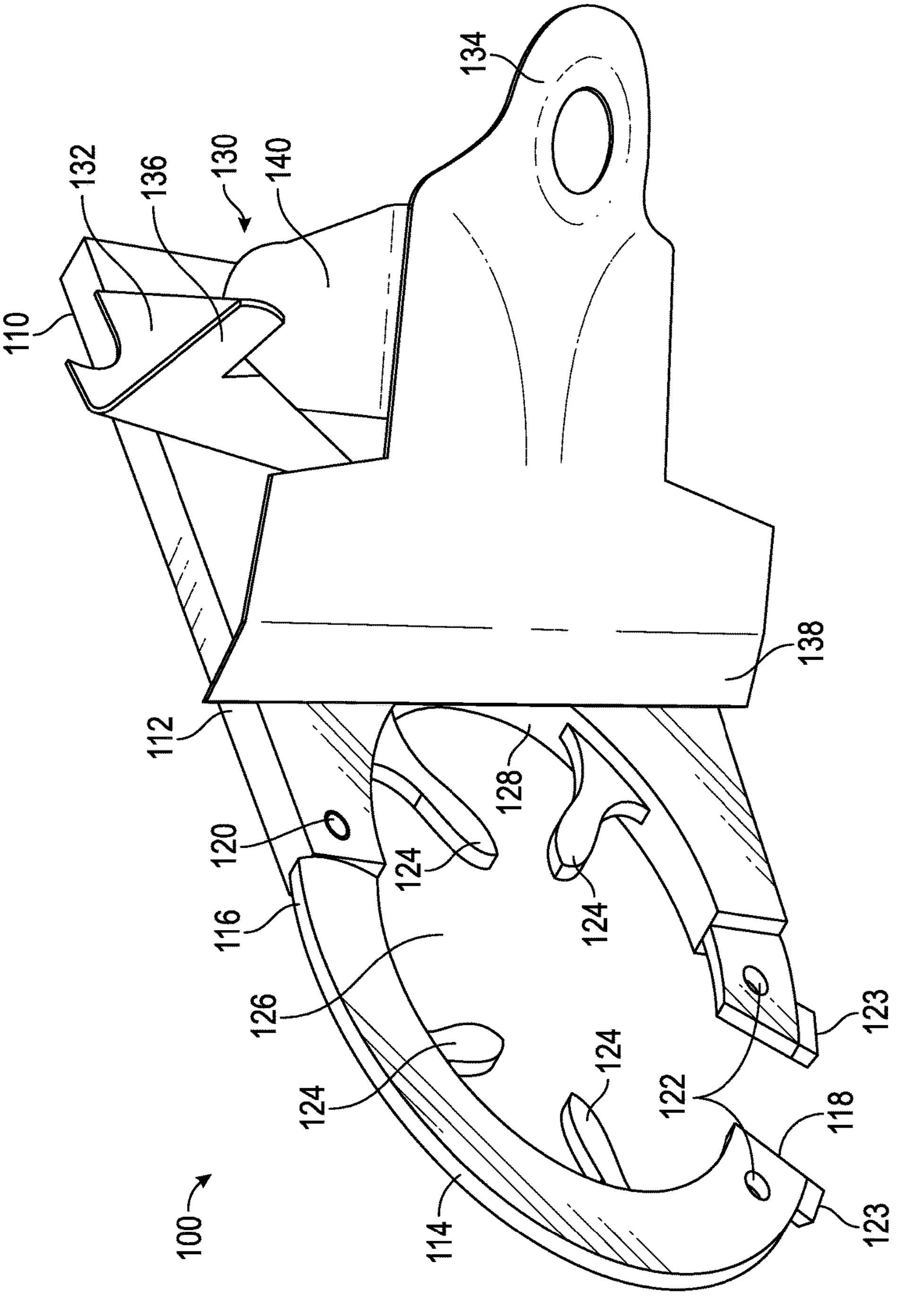
FIG. 1 is a perspective view of a back (can side) of a cinch device according to an embodiment of the present invention showing the device in an open position.
Figure 2:
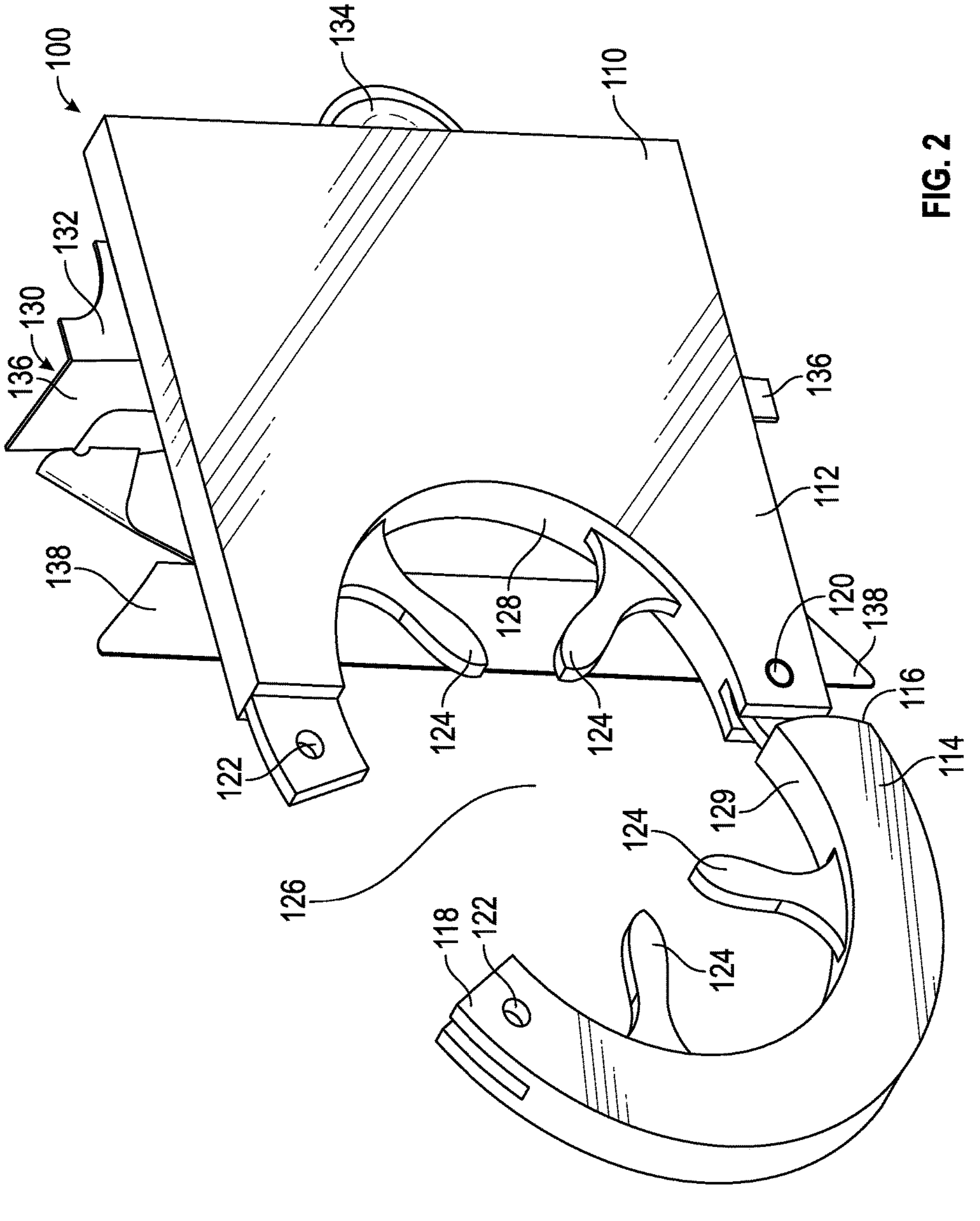
FIG. 2 is a perspective view of a front (liner strip side) of the embodiment of the cinch device shown in FIG. 1 showing the device in an open position.
Figure 3:
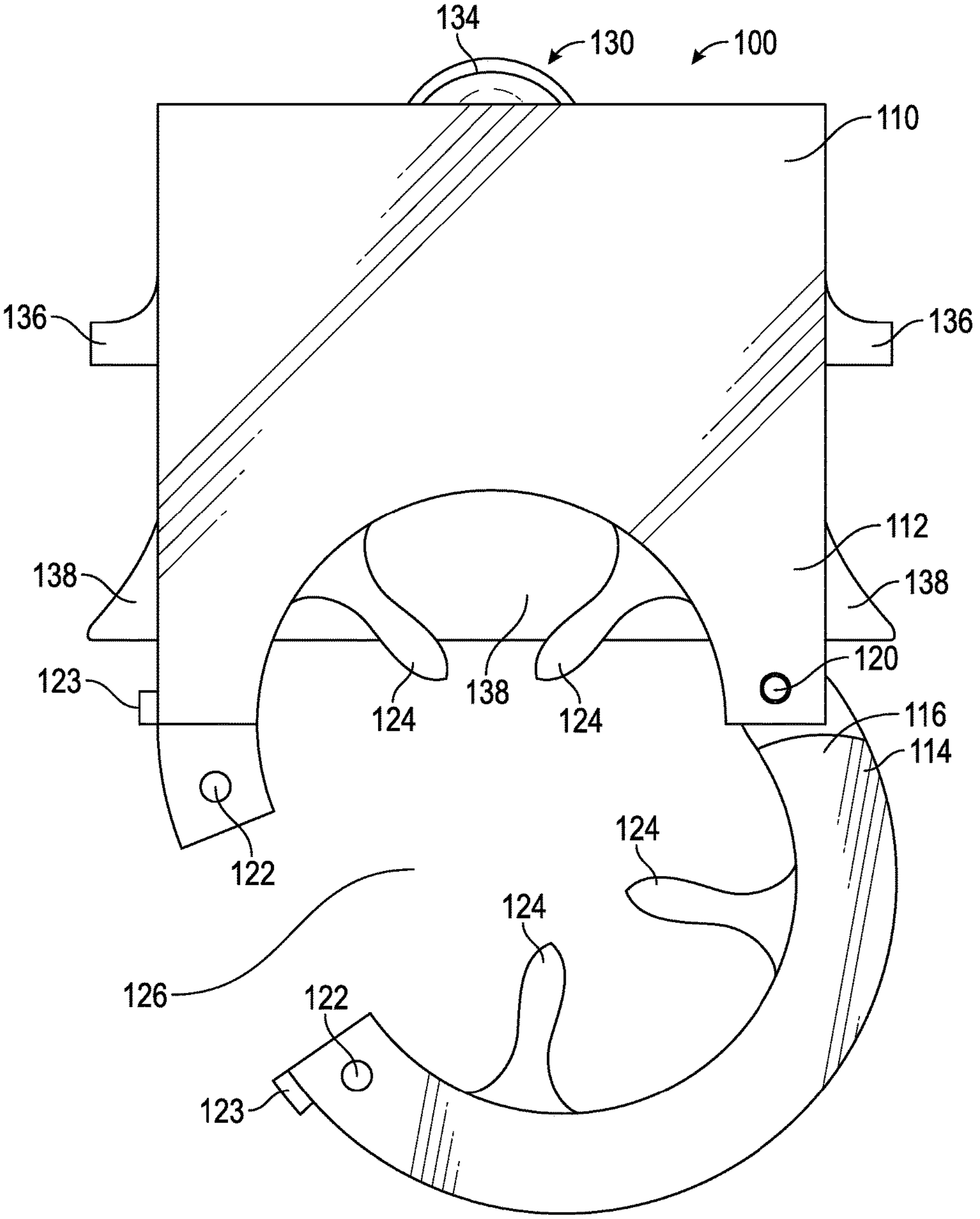
FIG. 3 is a front elevation view of the front (liner strip side) of the embodiment of the cinch device shown in FIGS. 1 and 2 showing the device in an open position.
Figure 4:
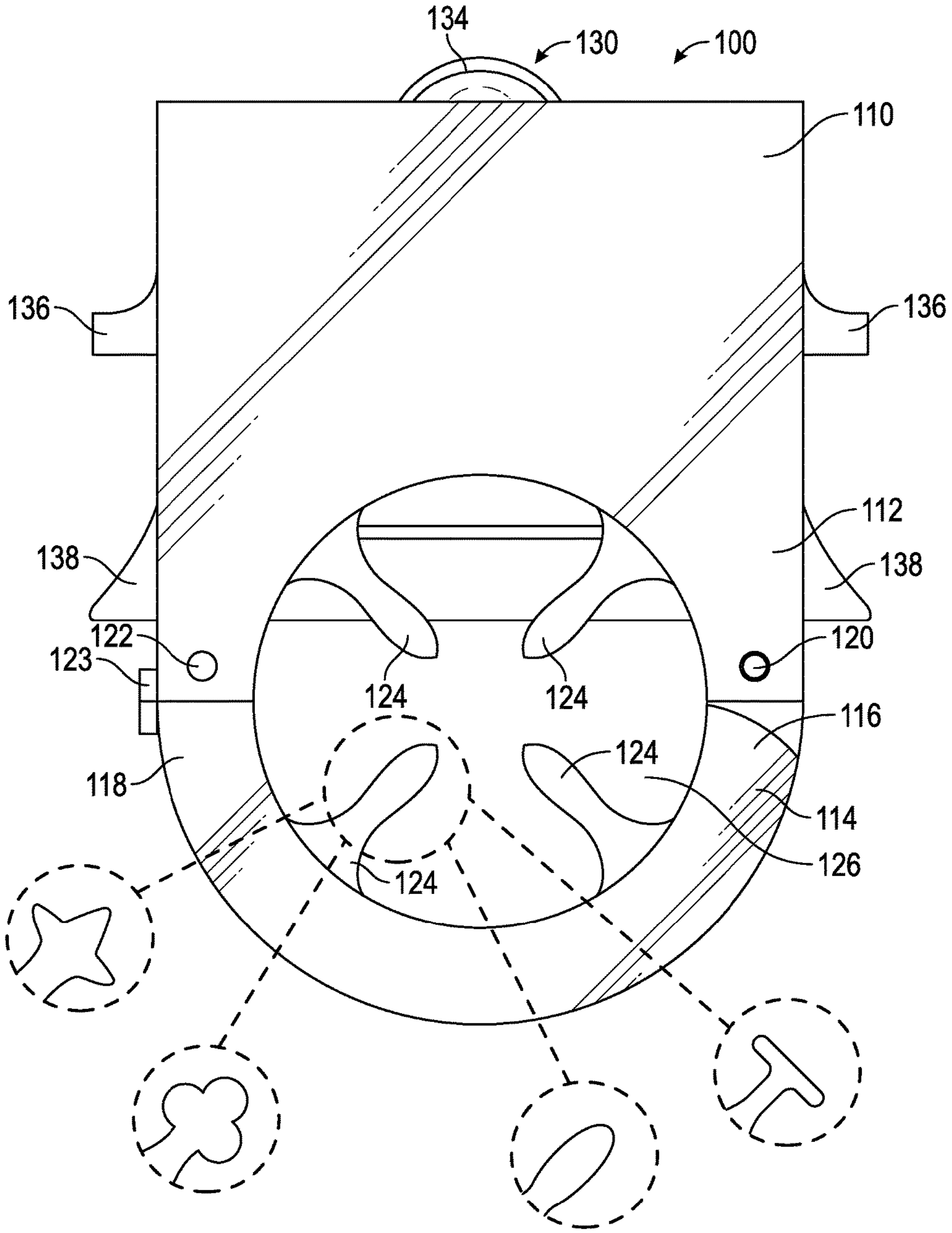
FIG. 4 is a front elevation view of the front (liner strip side) of the embodiment of the cinch device shown in FIGS. 1-3 showing the device in a closed position and also illustrating various types of teeth.
Figure 5:
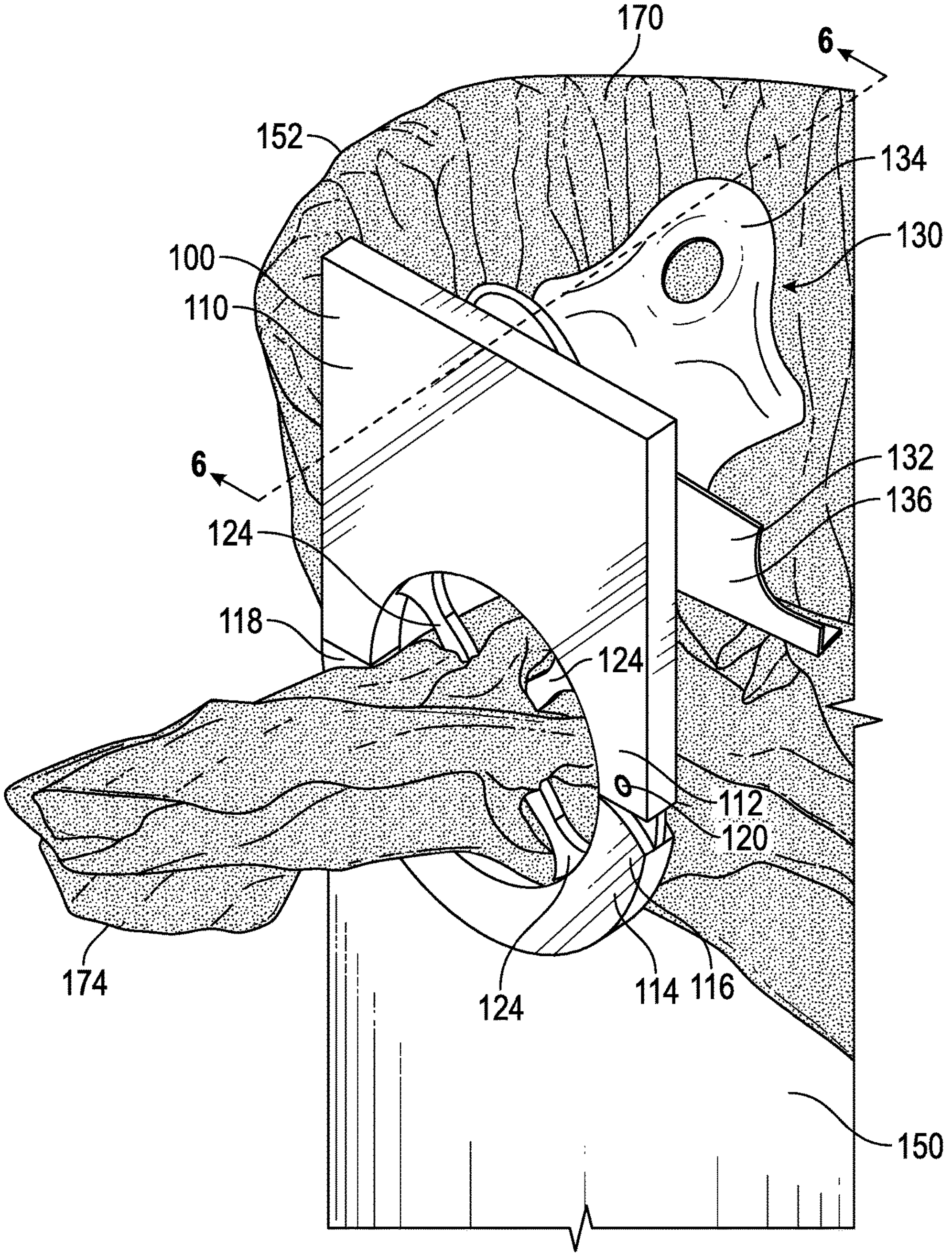
FIG. 5 is a perspective view of the embodiment of the cinch device shown in FIGS. 1-4 showing the device in use.
Figure 6:
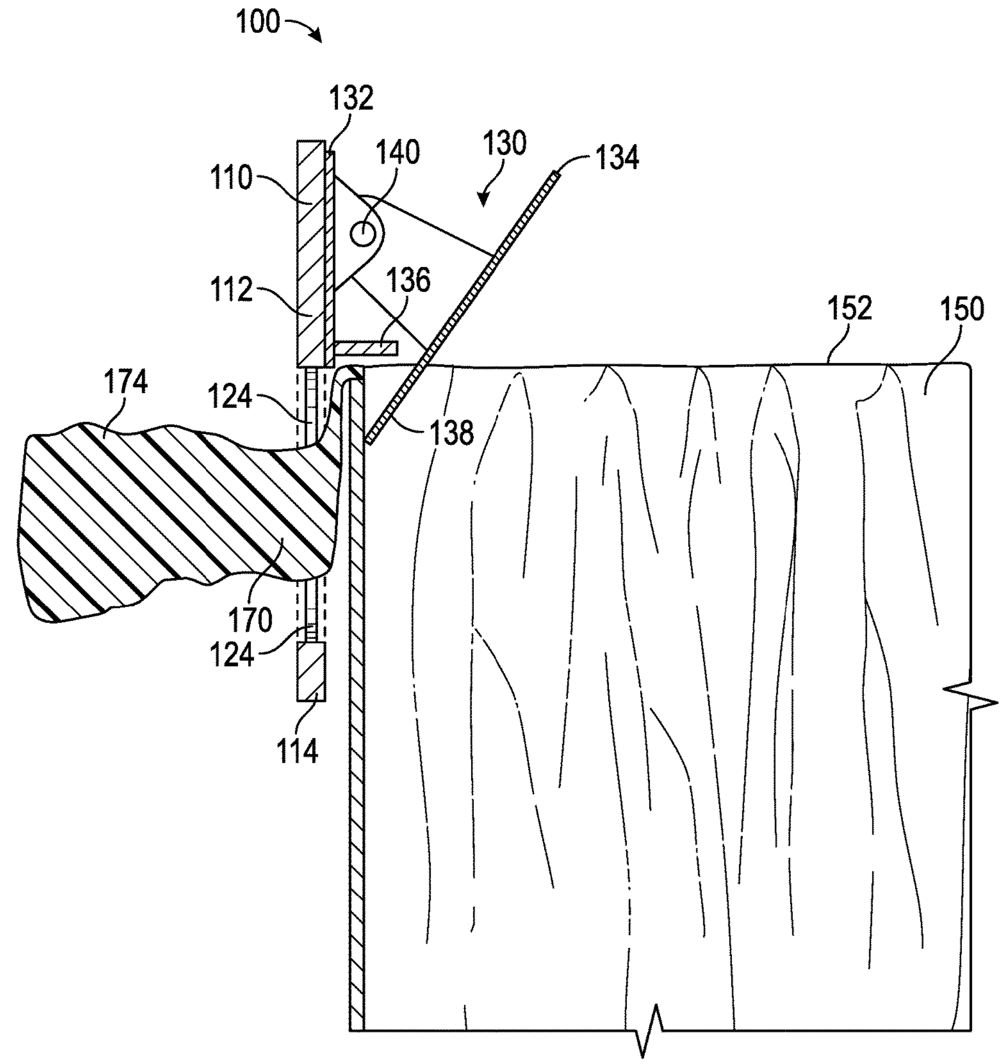
FIG. 6 is a cross-sectional view taken generally along the plane of the line 6-6 in FIG. 5.

Looking first at FIGS. 1 (back side view) and 2-4 (front side view), an embodiment of the present invention is shown. A can liner cinch device 100 generally comprises a collar 110 and a clamp 130. The cinch device 100 is adapted to clamp onto the rim 152 of a trash can 150 into which has been placed a trash bag 170 (FIGS. 5 and 6). The collar 110 comprises a base 112 and a cuff 114. The collar 110 may be basically configured and operate not unlike handcuffs. The cuff 114 generally forms an arc which arc describes a concave edge 129 and is attached to the base 112 by a hinge 120 or other flexible means at a cuff hinged end 116 which allows the cuff 114 to open (FIGS. 1-3) and close (FIGS. 4 and 5) relative to the base 112. Thus, when the cuff 114 is in the closed position, an opening 126 is defined by a base concave edge 128 and the cuff 114. The cuff 114 may also include a fastener 122, 123 at a cuff free end 118 by which the cuff 114 is secured to the base 112, when, for example, the cinch device 100 is securing a trash bag 170 onto a trash can 150 (FIGS. 4-6). As one skilled in the art will appreciate, numerous methods of fastening the cuff free end 118 to the base 112 may be employed. For example, a ratchet-type of fastener used in handcuffs may ben employed. In addition, the hinge 120 may be replaced by a further fastener 122, 123 so that the cuff 114 may be removed completely from the base 112. Further, a spring-loaded hinge 120 may be employed by which the fastener 122, 124 may be eliminated. The cuff 114 further comprises one or more teeth 124 attached to the cuff concave edge 129. The cuff teeth 124 project away from the cuff concave edge 129 (FIG. 2) and, when the cuff 114 is in the closed position (FIGS. 4 and 5), toward the opening 126. Similarly, the base 112 further comprises one or more teeth 124 attached to the base concave edge 128. The base teeth 124 project away from the base concave edge 128 and, when the cuff 114 is in the closed position (FIGS. 4 and 5), toward the opening 126. The teeth 124 are adapted to grip the material of which the trash bag 170 is formed. Such materials include low density polyethylene (LDPE), linear low density polyethylene (LL-DPE), medium density polyethylene (HDPE), high density polyethylene (HDPE), polypropylene (PP), or oxo-biodegradable plastic, which comprises conventional polyolefin plastic to which has been added small amounts of metal salts, which salts catalyze the degradation process to speed it up so the oxo-plastic will degrade at the end of its useful life in the presence of oxygen much more quickly than ordinary plastic. The teeth 124 may be made from a soft, semi-flexible material which will grip the material. The teeth 124 may be biased toward a front side of the collar 110 to provide spring-like action to secure the trash bag 170 and keep it from sliding back (FIG. 5). As shown in FIG. 4, there are numerous types of teeth 124 which may be used to grip onto the material from which the trash bag 170 is formed.

Still looking at FIGS. 1-4, the clamp 130 is attached to a back side of the base 112. The clamp 130 may be not unlike a clipboard clamp which has been adapted to secure the cinch device 100 onto the rim 152 of a trash can 150 into which has been placed a trash bag 170 (FIGS. 5 and 6). The clamp 130 comprises a support 132 to which a lever 134 is attached with a spring-loaded hinge 140. The lever 134 comprises a pinch bar 138, which, with tension from the spring-loaded hinge 140, is urged toward the back side of the base 112. A stop 136 may be provided which may function to position the cinch device 100 onto the rim 152 of the trash can 150 (see also, FIGS. 5 and 6).

Figure 7:
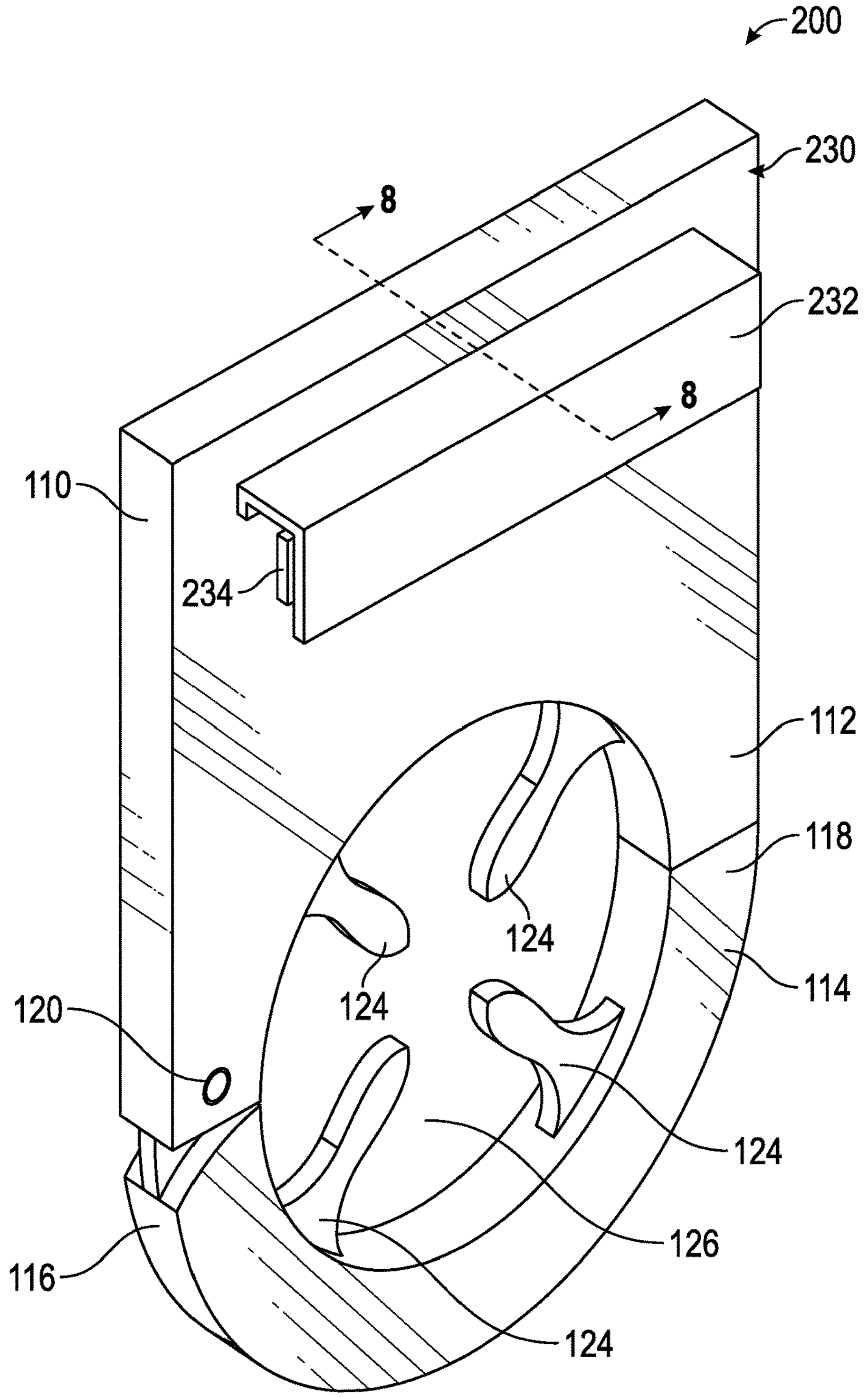
FIG. 7 is a perspective view of a back (can side) of a cinch device according to a further embodiment of the present invention.
Figure 8:
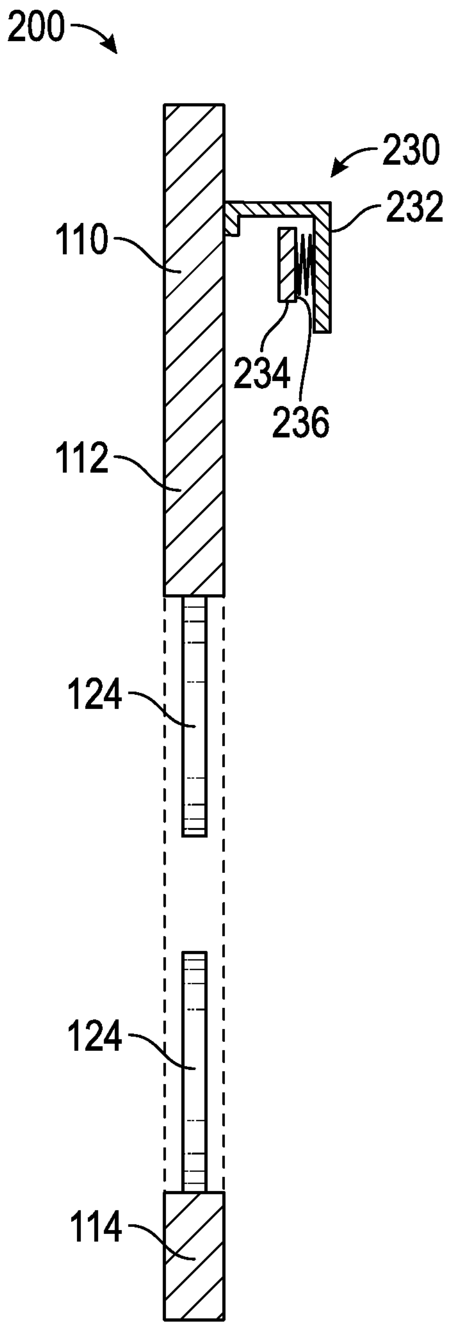
FIG. 8 is a cross-sectional view taken generally along the plane of the line 8-8 in FIG. 7.

An alternative embodiment of a trash bag cinch device 200 is shown in FIGS. 7 and 8 wherein a clamp 230 is attached to a back side of the trash bag cinch device 200 and comprises a channel 232 to which is attached a pusher bar 234 by a spring 236. The collar 110 is configured as described in relation to FIGS. 1-6. The clamp 230 with the spring-loaded pusher bar 234 is allows the trash bag cinch device 200 to be fit snuggly onto the rim 152 of a trash can 150.

Turning now to FIGS. 5 and 6, to use the cinch device 100, 200 to secure a trash bag 170 to a trash can 150, the bag 170 is inserted into the can 150 and a bag top edge 172 (FIG. 10) draped over the can rim 152. A portion of the top edge 172 is gathered into a bag strip 174 and secured in the opening 126 of the cinch device 100, 200. The bag strip 174 may be placed into an open collar 110 and the cuff 114 fastened to the base 112. Alternatively, the cuff 114 may be fastened to the base 112 and the bag strip 174 pulled through the opening 126 of the closed collar 110. The cinch device 100, 200 is then secured onto the rim 152 of the can 150 using the clamp 130, 230. Alternatively, the cinch device may be initially secured onto the rim 152 of the can 150 and the bag strip 174 placed into the collar 110. When in place, a final pull on the bag strip 174 may be employed to snug the bag 170 about the can 150. A final pull can be especially helpful if the teeth 124 are biased as described above. A clamp stop 136 may be seated against the can rim 152 to provide a more secure and more stable mount of the cinch device 100, 200.

To release, the cuff 114 is unfastened or otherwise released from the base 112 and the cinch device 100, 200 removed from the rim 152 and the bag strip 174, thereby allowing the bag 170 and its contents to be removed from the can 150 and discarded.

Figure 9:
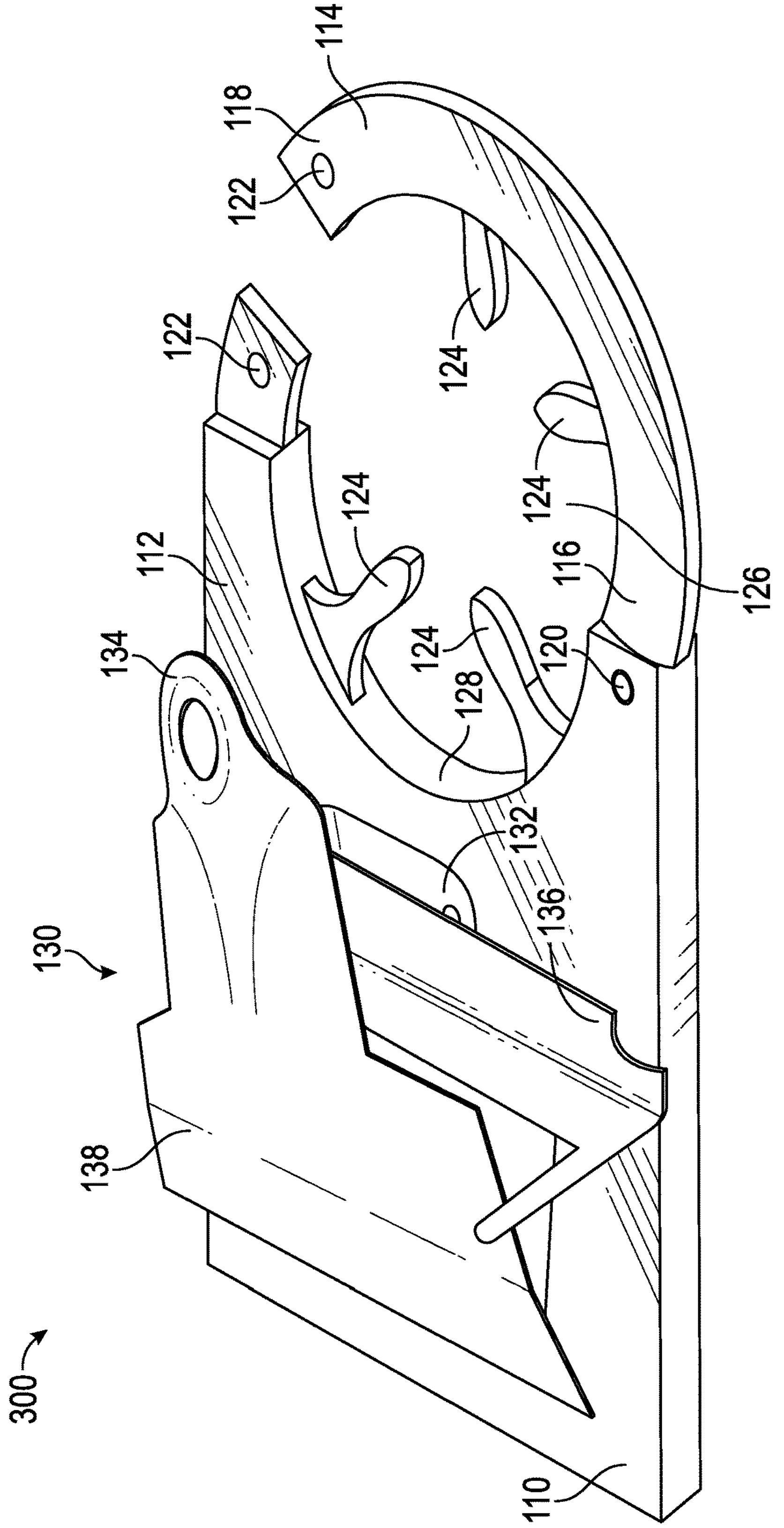
FIG. 9 is a perspective view of a back side of a cinch device according to a further embodiment of the present invention.
Figure 10:
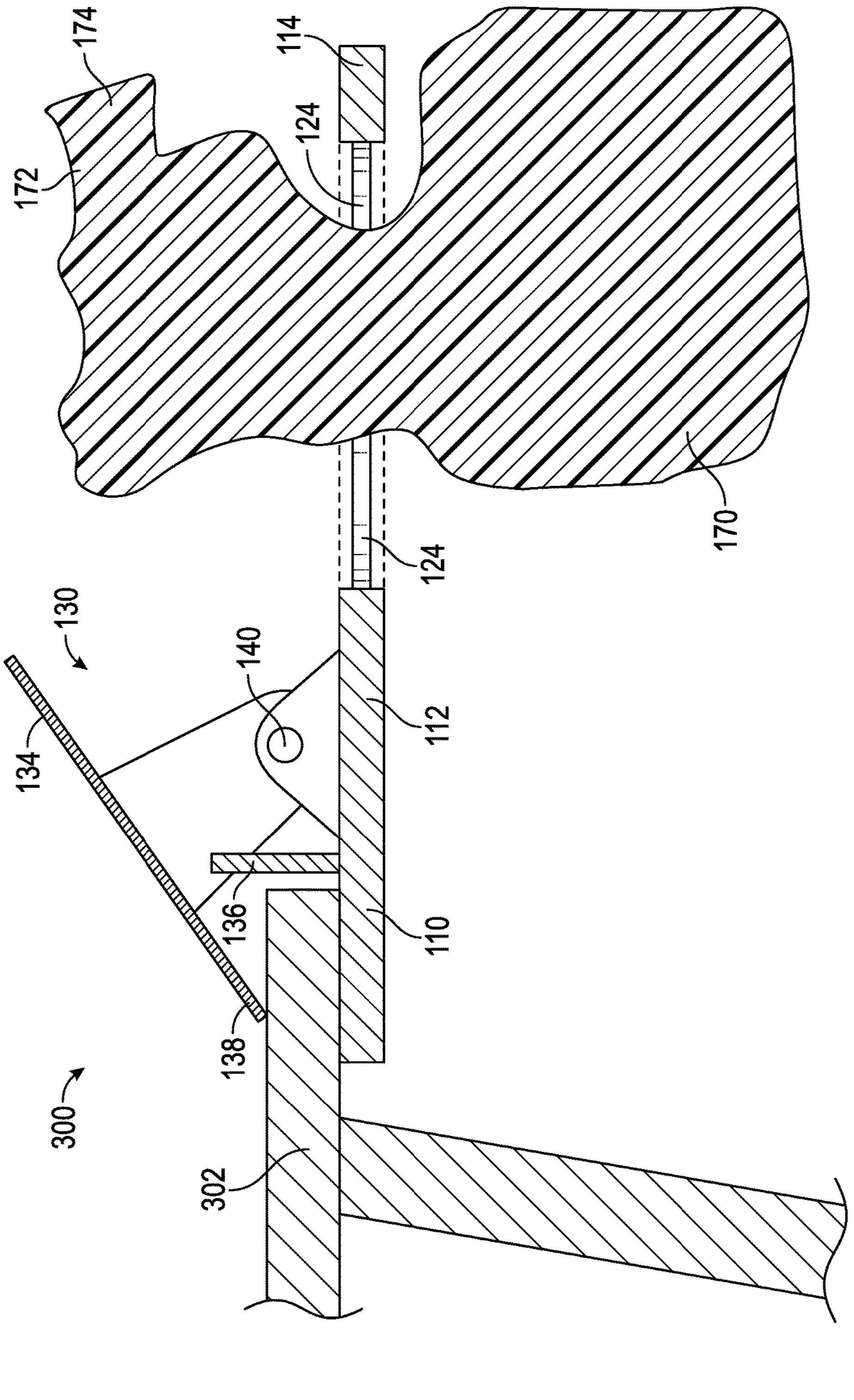
FIG. 10 is a cross-sectional view taken generally along the plane of the line 10-10 in FIG. 9 and showing the embodiment shown in FIG. 9 in use.

A further alternative embodiment is shown in FIGS. 9 and 10. The cinch device 300 shown in FIGS. 9 and 10 may be similar to the cinch device 100 described above and shown in FIGS. 1-6. As shown in FIGS. 9 and 10, however, the clamp 130 is rotated such that the pinch bar 138 is positioned distal from the opening 126. The clamp 130 may be rotatably attached to the collar 110 or may be secured in the distal position as shown in FIGS. 9 and 10. When attached to a table or counter 302 (FIG. 10) the collar 110 is positioned horizontally whereby a bag 170 may be hung through the opening 126 and draped in an open position, for example, when no can 150 is available.

Figure 11:
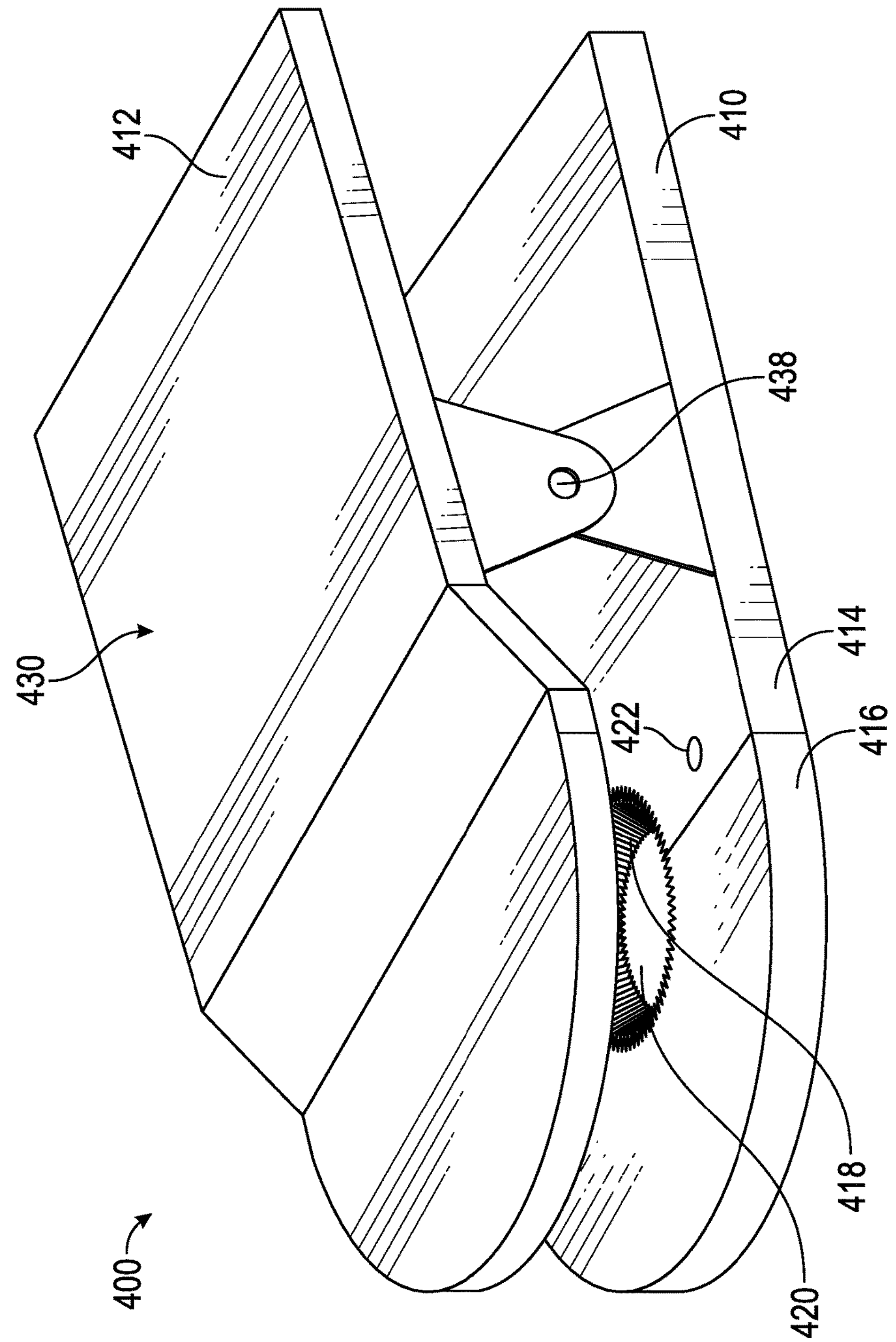
FIG. 11 is a perspective view of a back side of a cinch device according to a further embodiment of the present invention.
Figure 12:
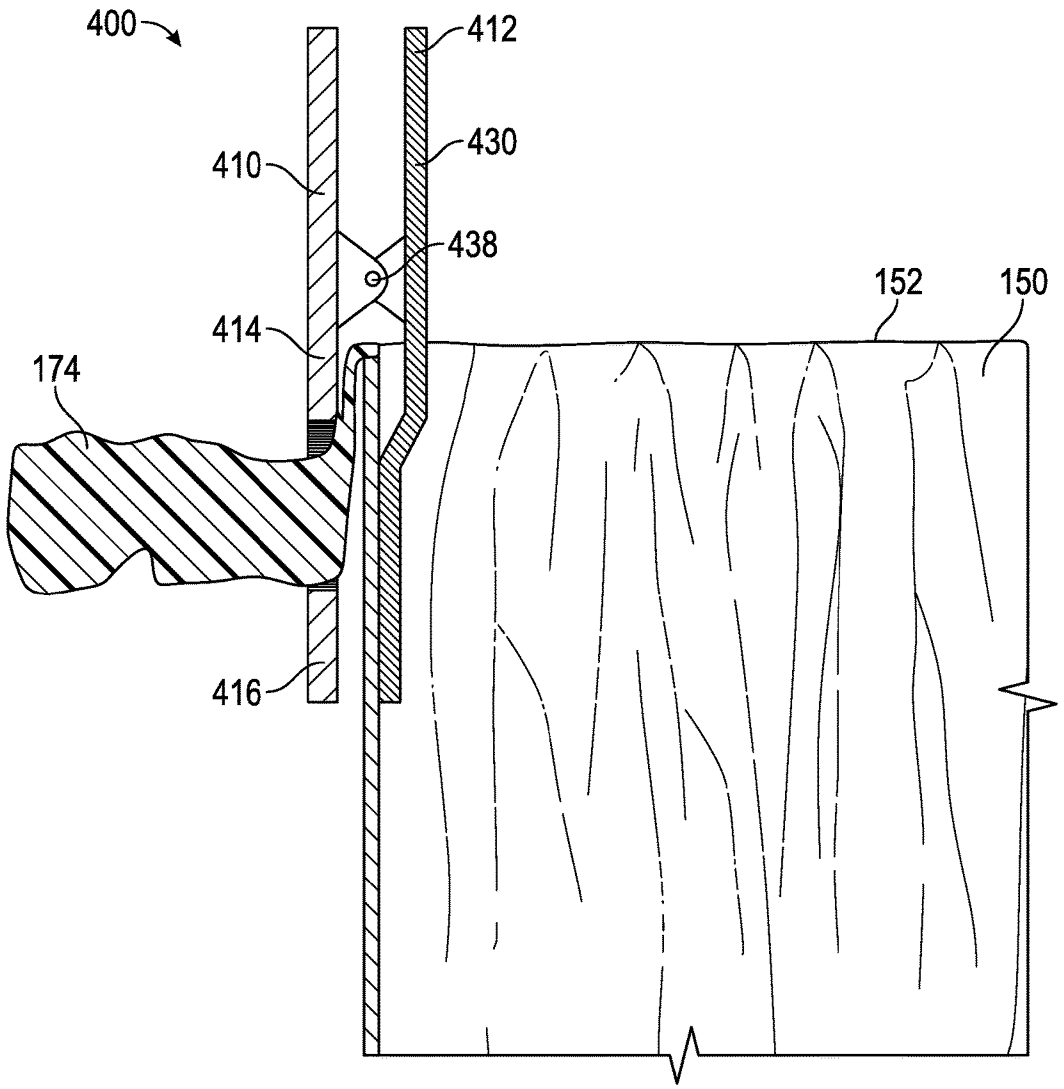
FIG. 12 is a cross-sectional view taken generally along the plane of the line 12-12 in FIG. 11 and showing the embodiment shown in FIG. 11 is use.

A further alternative embodiment is shown in FIGS. 11 and 12. A cinch device 400 comprises a tongue-shaped collar 410 and a clamp 430. The collar 410 comprises a base 414 and a cuff 416. The cinch device 400 is adapted to clamp onto the rim 152 of a trash can 150 into which as been placed a trash bag 170. The cuff 416 generally forms an arc and is attached to the base 414 by a hinge 422 or other flexible means which allows the cuff 416 to open and close relative to the base 414. The base 414 and cuff 416 further comprise teeth 418, which may comprise serrations. As shown in FIG. 11, the serrations may point downward to provide stronger grabbing of the bag strip 174. Still looking at FIGS. 11 and 12, the clamp 430 is attached to the collar 410 with a spring-loaded hinge 438 and manipulated using a lever 412.

To use the cinch device 400 to secure a trash bag 170 to a trash can 150, the bag is inserted into the can 150 and the bag 170 draped over the can rim 152 (FIGS. 5 and 12). A bag strip 174 is secured in the opening 420 of the cinch device 400. The bag strip 174 may be placed into an open collar 410 and the cuff 416 fastened to the base 414. Alternatively, the cuff 416 may be fastened to the base 414 and the bag strip 174 pulled through the opening 420 of the closed collar 410. The cinch device 400 is then secured to the rim 152 of the can 150 using the clamp 430. When in place, a final pull on the bag strip 174 may be employed to snug the bag 170 about the can 150. To release, the cuff 416 is unfastened or otherwise released from the base 414 and the cinch device 400 removed from the rim 152 and the bag strip 174, thereby allowing the bag 170 and its contents to be removed from the can 150 and discarded.

Figure 13:
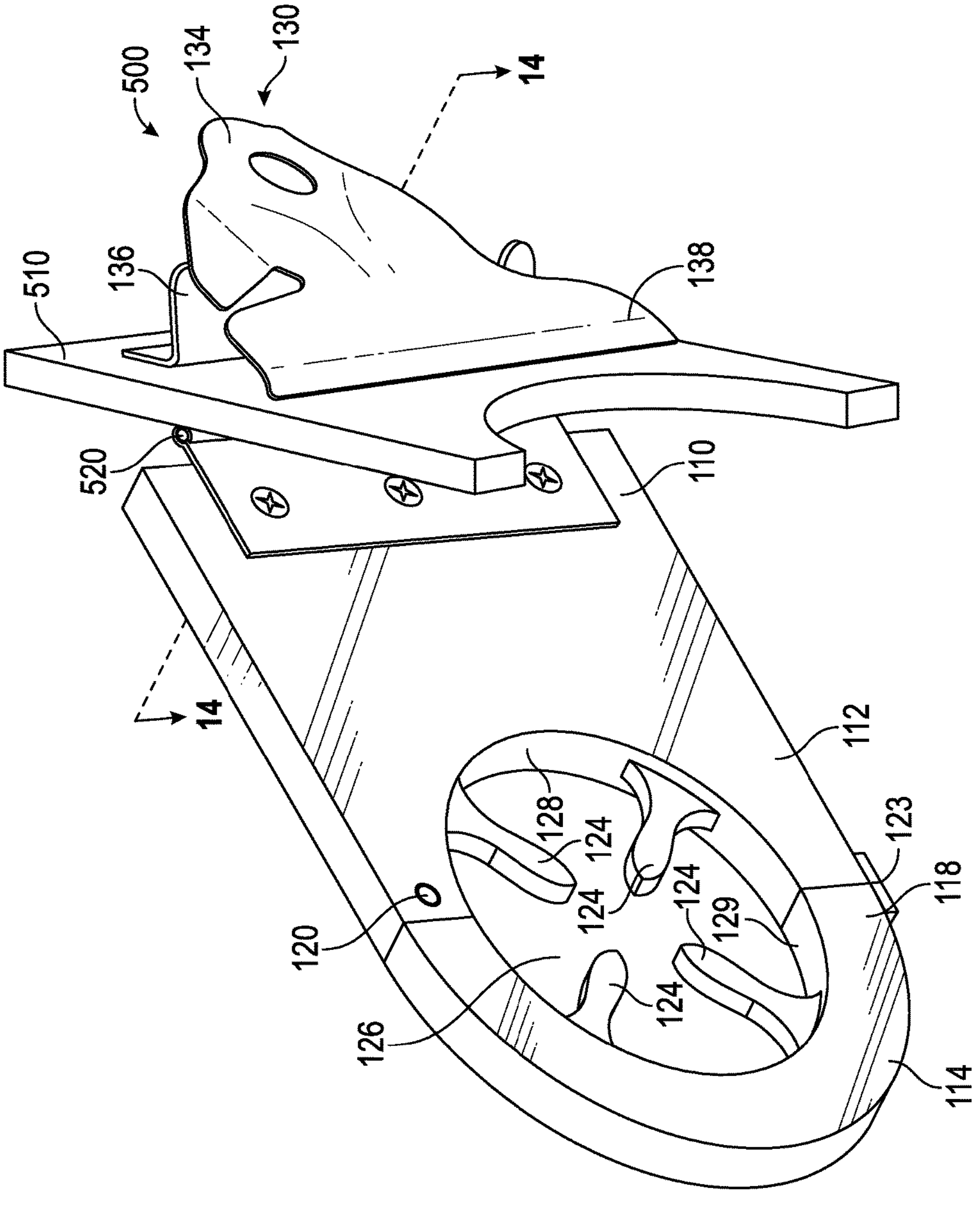
FIG. 13 is a perspective view of a back (can side) of a cinch device according to a further embodiment of the present invention.
Figure 14:
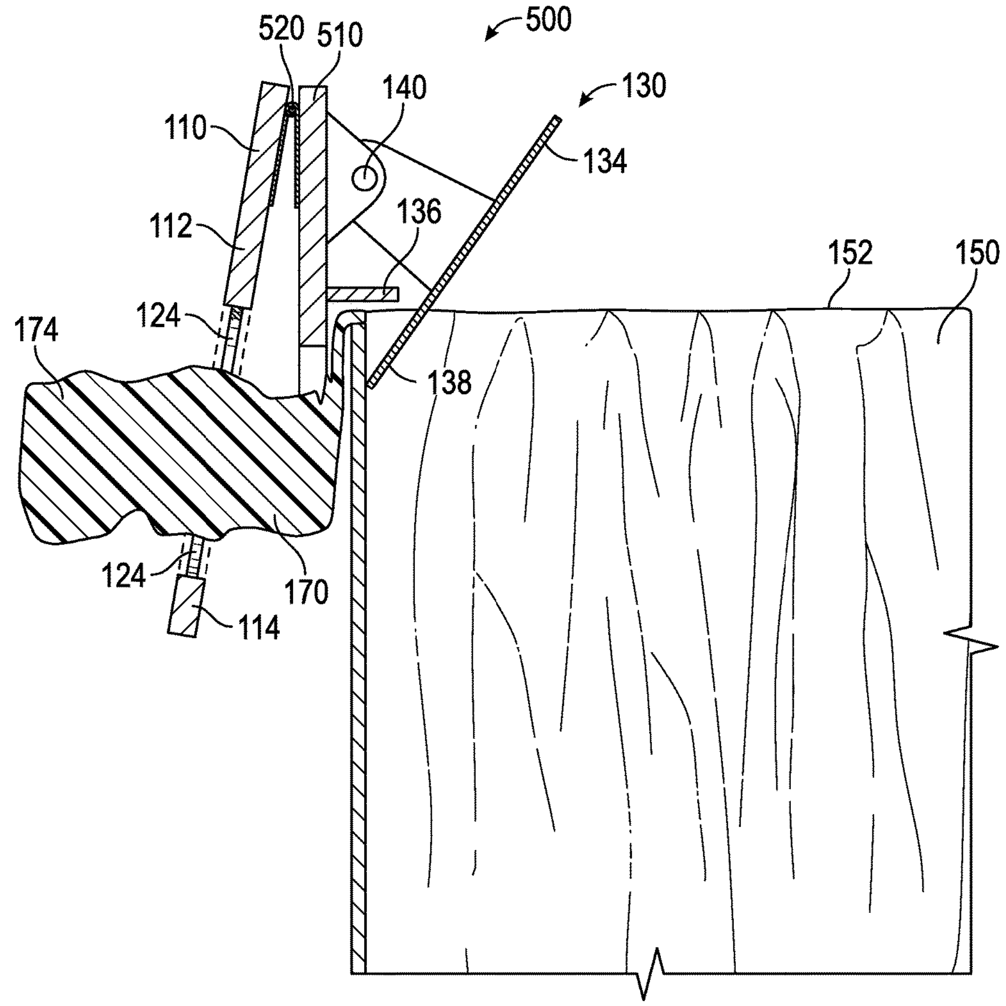
FIG. 14 is a cross-sectional view taken generally along the plane of the line 14-14 in FIG. 12 and showing the embodiment shown in FIG. 13 in use.

A further embodiment is shown in FIGS. 13 and 14. A can liner cinch device 500 comprises a clamp 130, a backing plate 510, and a collar 110, and the collar comprises a base 112 and a cuff 114. The clamp 130 comprises a lever 134 which is secured to a back side of the backing plate 510 with a spring-loaded hinge 140 (FIGS. 1, 6, and 10 and a stop 136. A pinch bar 138 is provided on an end of the lever 134 which, with spring tension, is urged toward the backing plate 510. The collar 110 is hingedly attached to the opposite side of the backing plate 510. The collar 110 is generally shaped and comprised as described above with a base 112 and a cuff 114. The base 112 and the cuff 114 comprise teeth 124 which are adapted to secure a bag strip 174 (FIG. 14).

In use, the hinge 520 may be a detent hinge, also variously known as a ratchet hinge of incremental locking hinge. Or, the hinge 520 may be spring-loaded to provide a pulling force on the bag strip 174 to help keep the strip 174 snug on the can 150. Alternatively, the cinch device 500 may be configured to hold a bag 170 in an open position as shown in FIG. 10.

While certain embodiments of the present invention have been disclosed in detail, it is to be understood that various modifications may be adopted without departing from the spirit of the invention or scope of the following claims.

I claim:

1. A trash can liner cinch device, comprising:
- a collar, the collar having a front side and a back side, the collar comprising:
  - a base, the base comprising:
    - a first corner;
    - a second corner; and
    - a concave edge, the concave edge formed between the base first corner and the base second corner, the base concave edge comprising a plurality of flexible teeth, the base teeth attached to and projecting away from the base concave edge, the base teeth biased toward the collar front side; and
  - a cuff, the cuff forming an arc, the arc comprising a concave edge, the cuff comprising:
    - a plurality of flexible teeth, the cuff teeth attached to and projecting away from the arc concave edge, the cuff teeth biased toward the collar front side;
    - a cuff hinged end, the cuff hinged end hingedly attached to the base first corner; and
    - a cuff free end, the cuff free end adapted to fasten to the base second corner, wherein when the cuff is fastened to the base, the base concave edge and the cuff concave edge cooperate to form an opening; and
- a clamp, the clamp comprising:
  - a support, the clamp support affixed to the collar back side;
  - a lever, the clamp lever hingedly attached to the support, the clamp lever comprising a pinch bar; and
  - a stop, the clamp stop affixed to the clamp support, the clamp stop in a spaced-apart relation to the clamp pinch bar.

2. The trash can liner cinch device of claim 1, wherein the base teeth and the cuff teeth are adapted to grip trash can liner material.

* * * * *